United States Patent [19]

O'Connell et al.

[11] 4,017,239
[45] Apr. 12, 1977

[54] MOLDING APPARATUS

[75] Inventors: Ronald B. O'Connell, Waterville; Albert H. Prueter, Jr., Perrysburg, both of Ohio

[73] Assignee: The Goodyear Tire & Rubber Company, Akron, Ohio

[22] Filed: June 7, 1976

[21] Appl. No.: 693,658

[52] U.S. Cl. ............................ 425/175; 425/110; 425/242 R; 425/442; 425/450.1; 425/451.9

[51] Int. Cl.² ...................... B29C 1/00; B29C 27/30

[58] Field of Search ............... 425/242 R, 176, 177, 425/175, 447, 450.1, 451.9, 442, 110

[56] References Cited

UNITED STATES PATENTS

| | | | |
|---|---|---|---|
| 1,976,740 | 10/1934 | McChesney | 425/450.1 X |
| 2,027,165 | 1/1936 | Grubman | 425/176 |
| 3,677,677 | 7/1972 | Coppola | 425/442 X |
| 3,981,671 | 9/1976 | Edwards | 425/450.1 X |

Primary Examiner—Robert L. Spicer, Jr.
Attorney, Agent, or Firm—F W Brunner; Wolfe J D

[57] ABSTRACT

An improved molding apparatus which includes a lower mold part containing a seat to permit a wheel to be locked thereon to form a mold cavity between the upper surface of the lower mold part and under surface of the wheel, said wheel having openings therein including at least openings for mounting the wheel on an axle and for charging the cavity with molding material, a sealing means for sealing the openings in the wheel, said sealing means being pivotable about the lower mold part by a pivot frame to bring the sealing means into a locked sealing relationship through an elastomeric gasket, said gasket in the locked sealing relationship being under uniform compression, said uniform compression being achieved by action of at least three springs located around the seal means and between the pivot frame.

3 Claims, 2 Drawing Figures

MOLDING APPARATUS

This invention relates to an improved molding apparatus. More particularly, this invention relates to an improved molding apparatus having means for applying uniform compression to the elastomeric gasket sealing the mold openings.

Molded plastic decorative metallic wheels for automobiles have been manufactured for a number of years. The nature of these molded plastic decorative metallic wheels and the process of molding them are described in U.S. Pat. Nos. 3,935,291 (Jackson) and 3,669,501 (Derleth) and 3,756,658 (Adams).

In making molded plastic decorative metallic wheels, the amount of molded material loss to waste as sprue and defective moldings was extremely high, at times and in some instances being as high as 5 or more percent.

We have discovered that sprue wastage and defective moldings are appreciably reduced if the molding apparatus is equipped with at least three springs to uniformly compress the elastomeric gasket in contact with the openings in the wheel.

Figure 1:
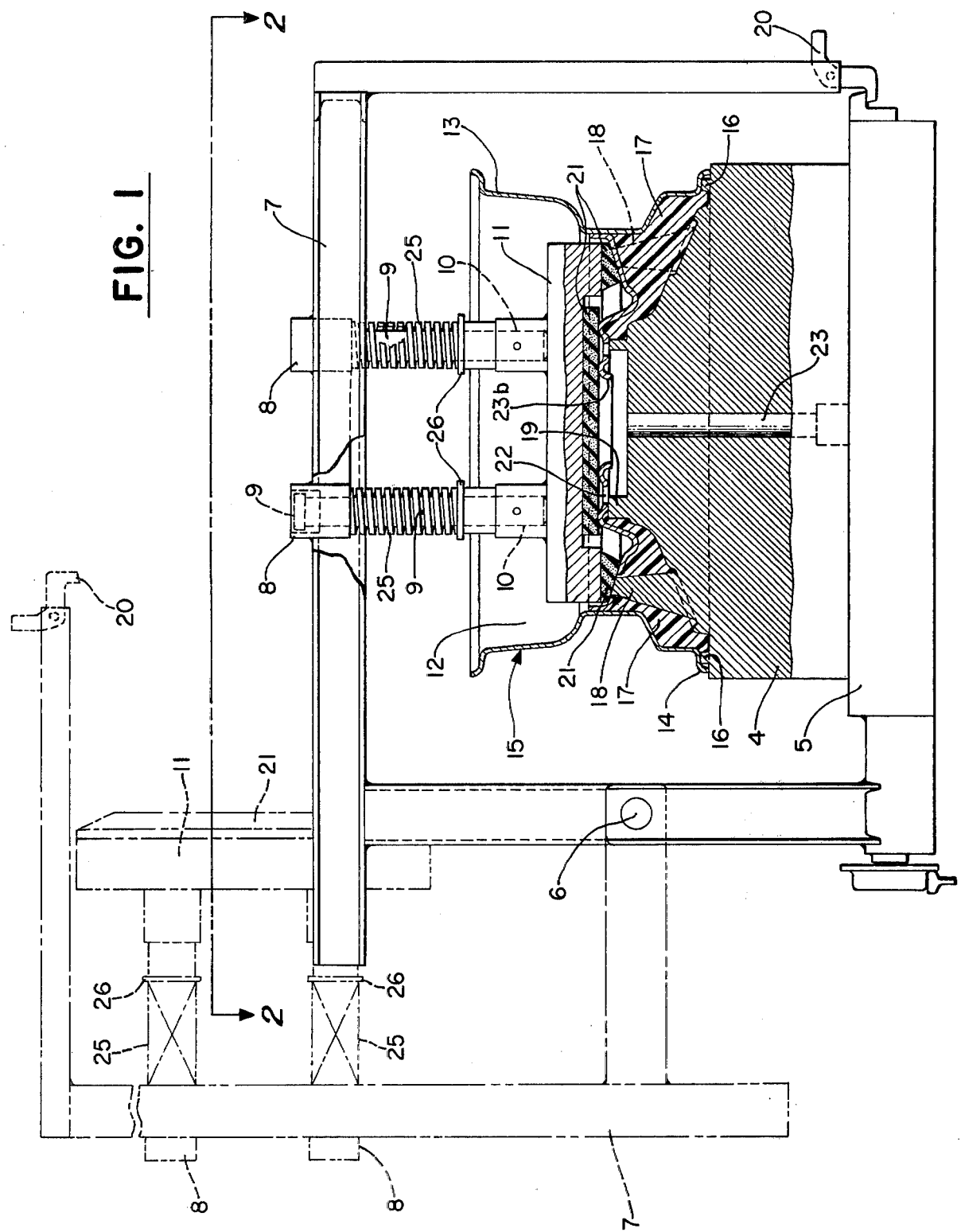
Figure 2:
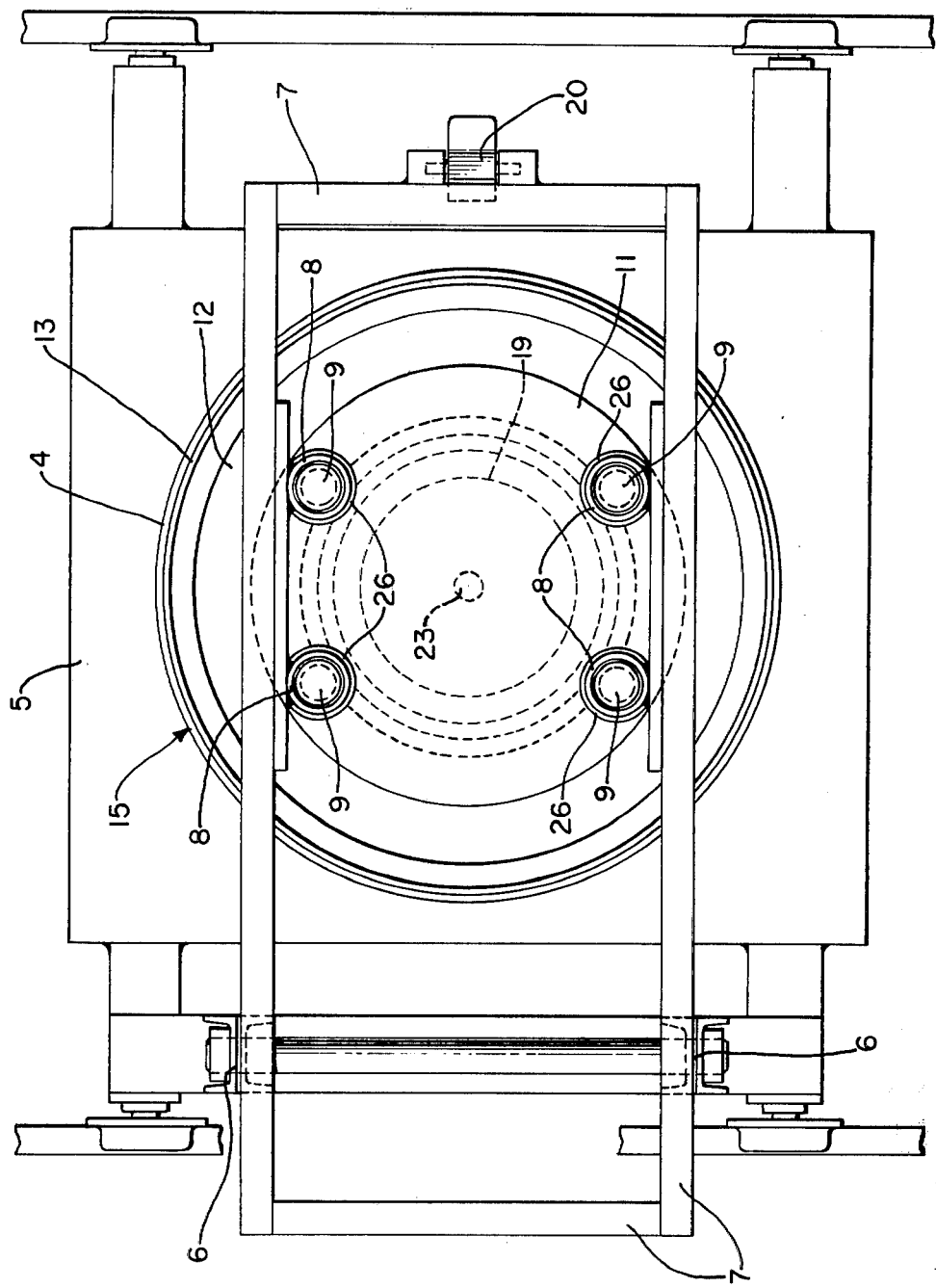

The further object and advantages of our invention can be understood more readily by reference to the drawings and following description, wherein:

FIG. 1 is an elevational view, partly in section, of the molding apparatus showing the lower mold part and the pivot frame in the closed position, and the pivot frame in broken lines representing the open position; and FIG. 2 is a plan view of the molding apparatus showing the pivot frame in the closed position.

Reference to FIGS. 1 and 2 shows the lower mold part 4 resting on a support 5 which can be a movable conveyor having a pair of pivot members 6 positioned as shown. Pivotably mounted on a pair of pivot members 6 is a pivot frame 7. The pivot frame supports four hollow pipes 8 that are attached thereto and project perpendicularly outward from the frame. Inside each of the four hollow pipes 8 are positioned a cylindrical rod 9, the end 10 of the cylindrical rod 9 projecting beyond the hollow rod 8 is attached by suitable means such as molding to a circular base member 11 of sufficient size to fit inside the circle 12 of the wheel rim 13 in the manner best shown in FIG. 2.

By reference to FIG. 1 it will be noted that the outer portion 14 of the wheel 15 rests or seats in the seat ring 16 of the lower mold part 4 to form a mold cavity 17 having trapezoidal members 18 projecting upward in the cavity to give the molded part the desired styling for the wheel.

With the wheel centered on the lower mold part by centering the pin or hub 19 and the pivot frame moved from the open position of FIG. 1 as shown in broken lines, to the closed position of FIG. 1, the clamp 20 can be closed to lock the lower mold part and the wheel together to give a mold having a relatively fixed molding cavity.

Reference to FIG. 1 shows that the circular base member 11 has a number of elastomeric gasket members 21, preferably silicone rubber gaskets, positioned thereon to cover the openings such as bolt holes 22 and those that styling members 18 fit within when the pivot frame is in the closed position to form a mold having cavity 17.

The mold material is charged through a hole 23 in the base member 11 and a hole 23b in the wheel 15 into the mold cavity and this hole can be stoppered in a manner well known to the art where necessary after the cavity has been charged.

As the pivot frame 7 is moved to the closed position of FIG. 1, the circular base member 11 contacts the exposed side of wheel 15 and the silicone gaskets 21 are compressed as the pivot frame moves to the position where the clamp 20 can be closed to lock the pivot frame in the closed position. Since the manufacturing tolerances for the wheel permits variation in each wheel dimensionally, the compression to which the silicone gasket is subject varies from molding to molding. Although this dimensional variation of each wheel is relatively small, it is surprising to discover this dimensional variation effects the efficiency of the molding operation and the percent rejects and amount of flash. Also, it is unexpected and unobvious to discover that if springs 25 are placed over each rod 9 between the pipe 8 and shoulder 26 on the circular base member 11, this would compensate for the dimensional variation of each wheel and complement the action of the silicone gasket to give a more effective molding apparatus.

This modification of the molding apparatus gives improved molding effectiveness in that it reduces flash, the elastomer gaskets last longer so do not require the apparatus to be shut down to change gaskets. Another very significant and unexpected advantage of this modified molding apparatus was that the springs, when the clamping action on the mold are released, produce a reaction that aided the stripping of the moled part from the mold. The difficulty of stripping the molded part from the mold is particularly described in Jackson's U.S. Pat. No. 3.935,291 and the fact the spring created a releasing action which aided stripping of the molded part is an unexpected benefit.

The advantages of this invention are particularly good when molding polyurethane microcellular or cellular decorative parts against a metal wheel in the manner described in Examples I to III of U.S. Pat. No. 3,935,291.

Preferably the spring loading assembly for controlling the compression or loading on the wheel rests on the lower mold part. Thus, where the spring loading assembly utilizes four springs on the rods to apply the pressure to close the mold assembly, viz. the wheel and the lower mold part, the pressure is distributed uniformly around the mold assembly and the sealing gaskets last longer and the opening of the mold is facilitated.

While certain representative embodiments and details have been shown for the purpose of illustrating the invention, it will be apparent to those skilled in the art that various changes and modifications may be made therein without departing from the spirit or scope of the invention.

What is claimed is:

1. An improved molding apparatus which includes a lower mold part containing a seat to permit a wheel to be locked thereon to form a mold cavity between the upper surface of the lower mold part and under surface of the wheel, said wheel having openings therein including at least openings for mounting the wheel on an axle and for charging the cavity with molding material, a sealing means for sealing the openings in the wheel, said sealing means being pivotable about the lower mold part by a pivot frame to bring the sealing means into a locked sealing relationship through an elastomeric gasket, said gasket in the locked sealing relationship being under uniform compression, said uniform compression being achieved by action of at least three springs located around the seal means and between the pivot frame.

2. The molding apparatus of claim 1 wherein the springs are located uniformly around the seal means and between the pivot frame.

3. The molding apparatus of claim 1, wherein the elastomeric gasket is a silicone elastomer.

* * * * *